G. H. MILLER.
METHOD OF TREATING BEEF CARCASSES.
APPLICATION FILED JUNE 21, 1915.
1,160,937.
Patented Nov. 16, 1915.
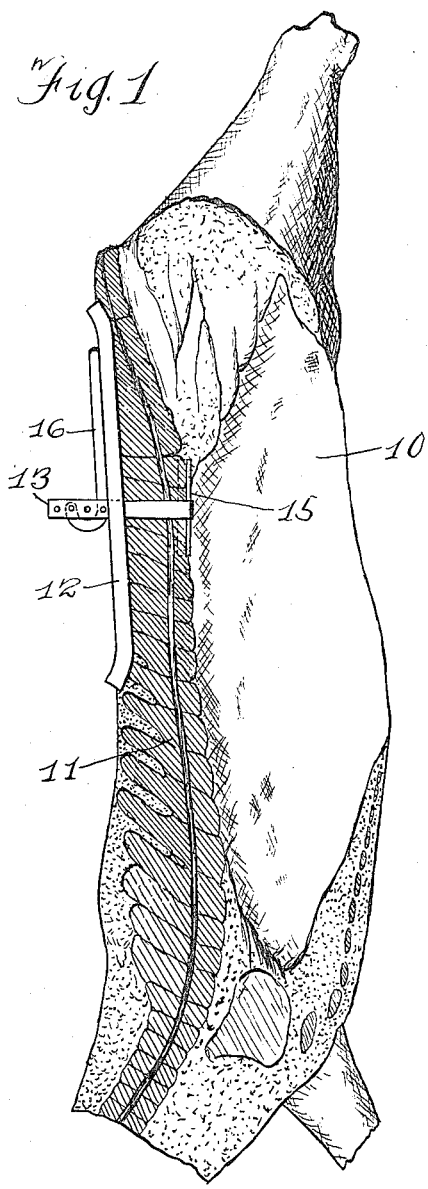
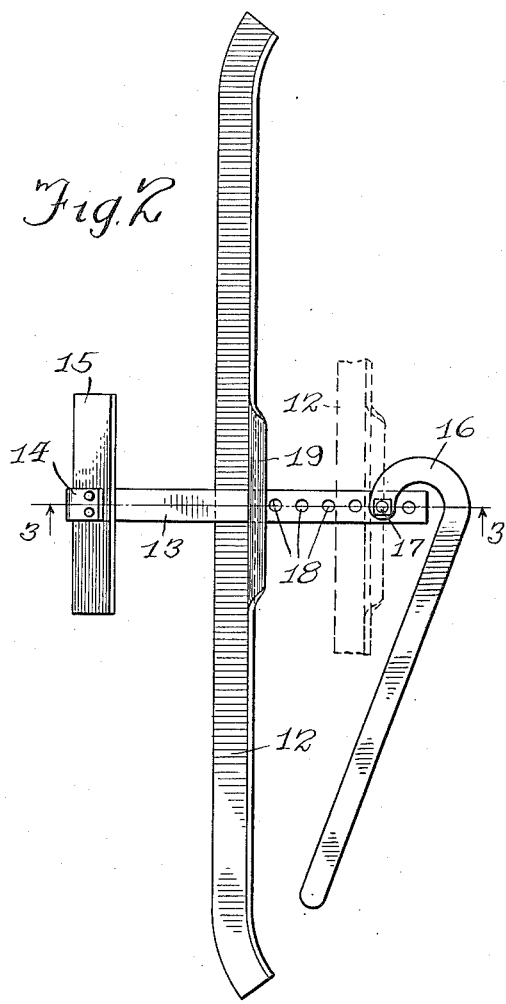

UNITED STATES PATENT OFFICE.

GRANT H. MILLER, OF CHICAGO, ILLINOIS.

METHOD OF TREATING BEEF-CARCASSES.

1,160,937.  Specification of Letters Patent.  Patented Nov. 16, 1915.

Application filed June 21, 1915. Serial No. 35,319.

*To all whom it may concern:*

Be it known that I, GRANT H. MILLER, a citizen of the United States, and a resident of Chicago, in the county of Cook, State of Illinois, have invented certain new and useful Improvements in Methods of Treating Beef-Carcasses.

This invention relates to improvements in methods of treating beef carcasses and to the apparatus for carrying out my improved process.

In a great proportion of the cattle slaughtered for beef there is normally a curvature in the loin portion of the backbone by reason of which the loin appears to be comparatively hollow. This condition prevents the acceptance of such a carcass as of the highest quality, even though in fact the loin is full and in prime condition.

It is one of the objects of my invention to correct any apparent defect in the shape and condition of the carcass so as to enable the carcass to stand on its true merits. I have accomplished this by straightening the backbone of the carcass opposite the loin while still warm after slaughtering, and holding the backbone in such straightened condition until the carcass is sufficiently chilled or set so as to prevent a return of the bone to its normal curved condition. Ordinarily the process of treating the beef comprises splitting the carcass in halves along the backbone and thereafter applying straightening means to each half of the bone, the straightening means being maintained in position until the side of beef is cooled.

It is another object of my invention to provide a novel form of device for applying the required pressure to the backbone of a carcass for the purpose of straightening the bone. The preferred form of the appliance I have designed for this purpose is illustrated in the accompanying drawings and is hereinafter specifically described.

That which I believe to be new and which I desire to cover by this application is set forth in the claims.

In the drawings:—Figure 1 is a view of a side of beef, or a beef half, with my preferred form of straightening means applied thereto; Fig. 2 is a view of the straightening device as seen from the opposite side, a portion of the pressure bar of the device being shown in dotted lines in changed position preparatory to having pressure applied thereto; and Fig. 3 is a cross-section taken on line 3—3 of Fig. 2.

Referring to the several figures of the drawings in which corresponding parts are indicated by the same reference characters, 10 indicates a side of beef, the backbone of which is indicated by the numeral 11. The straightening appliance comprises a pressure bar 12, preferably in the form of an angle-iron. A cross-bar 13 is slidable longitudinally of itself through a suitable slot through the middle portion of the bar 12. Attached to the turned end 14 of the cross-bar 13 is a short bar 15 comprising a pressure member adapted to coöperate with the pressure bar 12. A cam lever 16 is pivotally connected with the cross-bar 13 by means of a bolt 17 passing through any one of a series of openings or holes 18 through the cross-bar 13.

With the pressure bar 12 in the position indicated by dotted lines in Fig. 2, it will be understood that a stroke of the cam lever 16 in counterclockwise direction in said Fig. 2 will serve to move the pressure-bar 12 and the pressure member 15 toward each other. The curvature of the cam lever 16 is such that when the lever is moved into contact with the pressure bar 12 as shown in Fig. 1, the lever is automatically locked by the pressure against swinging out of contact with said pressure bar. It has not been deemed necessary to provide any additional means for locking the lever 16 in operative position, as shown in Fig. 1, but it will be understood that any suitable change as desired may be made in the detailed construction of the device without departing from my invention. One edge of one flange of the pressure bar 12 is turned at right angles at 19 to provide a guide for the cam lever 16, as will be readily understood.

By reason of the pressure bar 12 being similar at its opposite ends, the device is adapted for use on either half of a carcass as desired, the lever 16 in its locked position in one case extending upward from the cross-bar 13 and in the other case extending downward therefrom.

My complete process for treating a freshly-slaughtered beef carcass, as I prefer to practise the process, would consist first in splitting the carcass into halves along the backbone; and then applying my improved straightening appliance to the loin portion of the backbone, such appliance being retained in position until the carcass is set or chilled sufficiently so as to retain the abnormal straightened condition.

What I claim as my invention and desire to secure by Letters Patent, is—

1. The process of treating a beef carcass which comprises straightening the loin portion of the backbone while the carcass is still warm after slaughtering and holding it in such straightened condition until set.

2. The process of treating a beef carcass which comprises applying pressure upon the front and back of the loin portion of the backbone while the carcass is still warm after slaughtering and maintaining such pressure until the carcass is set.

3. The process of treating a beef carcass which comprises applying pressure to the front of the loin portion of the backbone and to the back of the backbone both above and below the first-named point of pressure while the carcass is still warm after slaughtering, and maintaining such pressure until the carcass is chilled sufficiently to hold such abnormal shape.

4. The process of treating the carcass of a freshly-slaughtered beef which comprises splitting the carcass substantially in halves along the backbone and then straightening the loin portion of the backbone and holding it in such straightened condition until sufficiently chilled to hold such abnormal shape.

5. The process of treating the carcass of a freshly-slaughtered beef which comprises splitting the carcass substantially in halves along the backbone and then applying to the half carcass pressure means for holding the backbone in substantially straightened condition until sufficiently chilled to hold such abnormal shape.

6. The process of treating a beef carcass which comprises reducing the curvature of the loin portion of the backbone while the carcass is still warm after slaughtering, and holding the backbone in such straightened condition until sufficiently chilled to prevent a return to the normal condition.

7. The process of treating the carcass of a freshly-slaughtered beef which comprises splitting the carcass substantially in halves along the backbone, applying to the backbone of the warm half carcass suitable pressure means for reducing the curvature of the loin portion of the backbone, and holding the backbone in such straightened condition until sufficiently chilled to prevent a return to the normal condition.

GRANT H. MILLER.